(12) United States Patent
Zakrevskis et al.

(10) Patent No.: US 11,657,108 B1
(45) Date of Patent: May 23, 2023

(54) SESSION REPLAY WITH MULTIPLE BROWSER TABS

(71) Applicant: Content Square SAS, Paris (FR)

(72) Inventors: Arturas Zakrevskis, Paris (FR); Andrei Pham, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 17/949,882

(22) Filed: Sep. 21, 2022

Related U.S. Application Data

(60) Provisional application No. 63/322,566, filed on Mar. 22, 2022.

(30) Foreign Application Priority Data

Mar. 23, 2022 (EP) ..................................... 22465521

(51) Int. Cl.
*G06F 3/048* (2013.01)
*G06F 16/954* (2019.01)
*G06F 3/0483* (2013.01)

(52) U.S. Cl.
CPC .......... *G06F 16/954* (2019.01); *G06F 3/0483* (2013.01)

(58) Field of Classification Search
None
See application file for complete search history.

(56) References Cited

U.S. PATENT DOCUMENTS

| | | | |
|---|---|---|---|
| 2014/0359489 A1* | 12/2014 | Zhao | G06F 3/0482 715/760 |
| 2017/0083181 A1* | 3/2017 | Brooks | H04L 67/535 |
| 2021/0258394 A1 | 8/2021 | Webber et al. | |

OTHER PUBLICATIONS

"European Application Serial No. 22465521.7, Extended European Search Report dated Aug. 22, 2022", 7 pgs.

* cited by examiner

*Primary Examiner* — William C Trapanese
(74) *Attorney, Agent, or Firm* — Schwegman Lundberg & Woessner, P.A.

(57) ABSTRACT

Aspects of the present disclosure involve a system comprising a computer-readable storage medium storing a program and method for providing session replay with multiple browser tabs. The program and method provide for receiving plural session events corresponding to a browsing session of a webpage, the plural session events corresponding to user interactions performed across plural browser tabs with respect to the webpage; determining, based on the plural session events and for each browser tab of the plural browser tabs, a set of in-focus time periods during which user interaction was focused on the browser tab relative to other browser tabs of the plural browser tabs; and consolidating, for the determined sets of in-focus time periods, session events of the plural session events into chronological order, the consolidated session events corresponding to a single stream of in-focus activity for the browsing session across the plural browser tabs.

20 Claims, 8 Drawing Sheets

US 11,657,108 B1

SESSION REPLAY WITH MULTIPLE BROWSER TABS

TECHNICAL FIELD

The present disclosure relates generally to web session analysis, including providing session replay with multiple browser tabs within an experience analytics system.

BACKGROUND

Web analysis solutions provide for the collection and analysis of website data. Such solutions may provide for capturing user interaction with respect to webpage visits.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Web analysis solutions provide for the collection and analysis of website data. User interaction with a webpage may take place across multiple browser tabs. In a case where a user switches between browser tabs, it may be desirable for playback of recorded session activity to reflect the switching between browser tabs and the user interactions performed with respect to browser tabs.

The disclosed embodiments provide an experience analytics system configured to perform session replay for a webpage based on session events spanning multiple browser tabs. The experience analytics system determines, based on the session events and for each browser tab, a set of in-focus time periods during which user interaction was focused on the browser tab relative to other browser tabs of the plural browser tabs. The experience analytics system consolidates, for the sets of in-focus time periods, session events of the plural session events into chronological order. The consolidated session events correspond to a single stream of in-focus activity for the browsing session across the plural browser tabs. In this manner, the experience analytics system provides for more accurate session replay, even in cases where the session events span multiple browser tabs during a browsing session.

Moreover, for each browser tab, the experience analytics system determines, based on the plural session events, a set of out-of-focus time periods during which user interaction was not focused on the browser tab. The experience analytics system combines, for the determined set of out-of-focus time periods, session events of the plural session events into a single point of time for the browser tab. In addition, the experience analytics system adds the combined session events to a respective in-focus time period for the browser tab. In this manner, the experience analytics system provides for retaining background events (e.g., DOM mutations, dynamic stylesheet changes, and the like).

Networked Computing Environment

Figure 1:
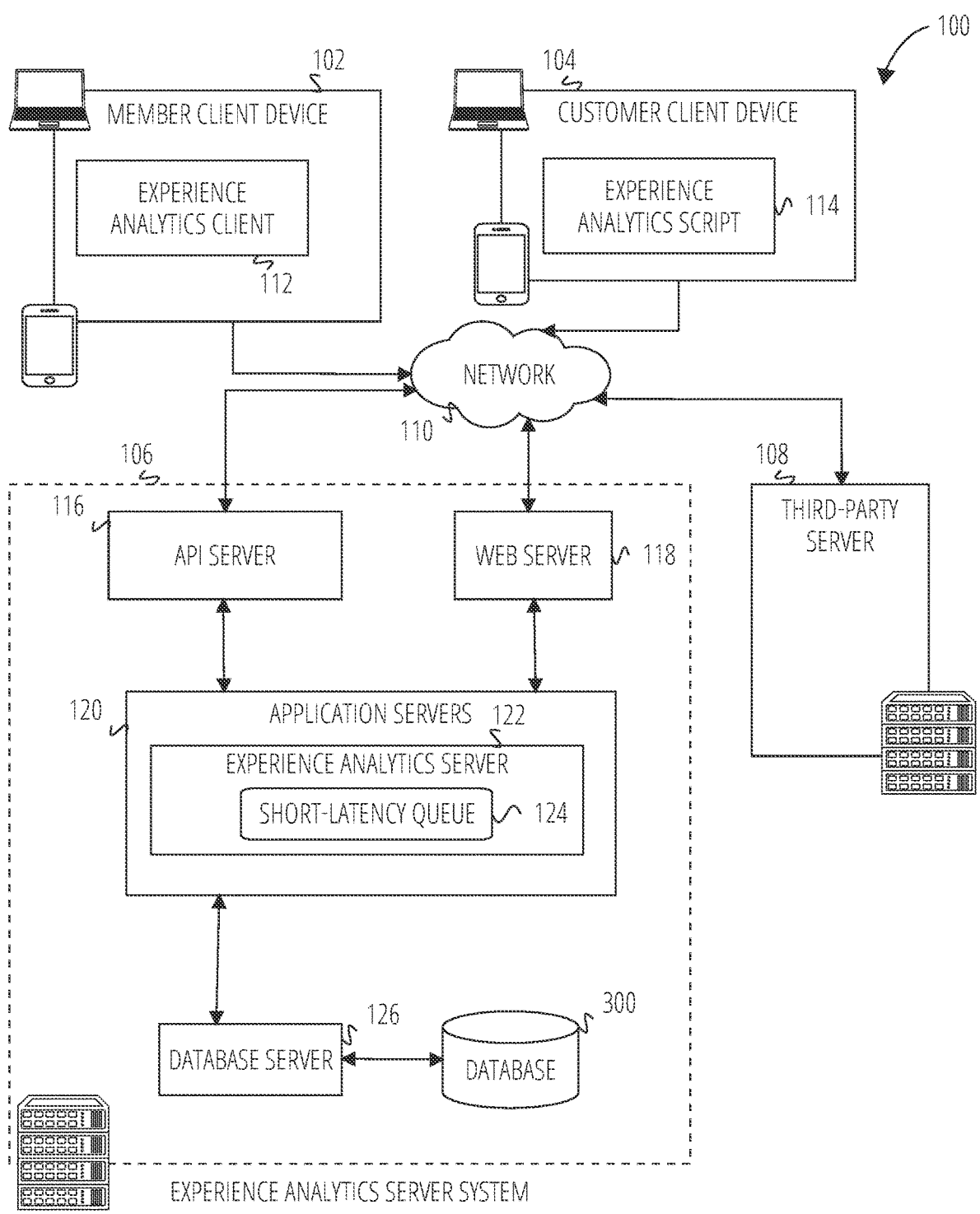
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 104, and multiple instances of a third-party server 108.

The member client device 102 is associated with a client of the experience analytics system 100, where the client that has a website hosted on the client's third-party server 108. An agent of the client (e.g., a web administrator, an employee, an operator, etc.) can be the user of the member client device 102.

Each of the member client devices 102 hosts a number of applications, including an experience analytics client 112. Each experience analytics client 112 is communicatively coupled with an experience analytics server system 106 and third-party servers 108 via a network 110 (e.g., the Internet). An experience analytics client 112 can also communicate with locally-hosted applications using Applications Program Interfaces (APIs).

The member client devices 102 and the customer client devices 104 can also host a number of applications including Internet browsing applications (e.g., Chrome, Safari, etc.). The experience analytics client 112 can also be implemented as a platform that is accessed by the member client device 102 via an Internet browsing application or implemented as an extension on the Internet browsing application.

Users of the customer client device 104 can access client's websites that are hosted on the third-party servers 108 via the network 110 using the Internet browsing applications. For example, the users of the customer client device 104 can navigate to a client's online retail website to purchase goods or services from the website.

The third-party server 108 may include data relating to websites, data relating to webpages, other, like, data, and any combination thereof. The third-party server 108 may be a local web source(s), remote web source(s), or any combination thereof, including a cloud-based network(s), distributed network(s), and the like. Examples of the third-party server 108 include, but are not limited to, repositories of webpage information, repositories of webpage element or zone information, servers configured to provide "live" webpages, other, like, sources, and any, combination thereof.

While a user of the customer client device 104 is navigating a client's website on an Internet browsing application, the Internet browsing application on the customer client device can also execute a client-side script (e.g., JavaScript (.*js)) such as an experience analytics script 114. In one example, the experience analytics script 114 is hosted on the third-party server 108 with the client's website and processed by the Internet browsing application on the customer client device 104. The experience analytics script 114 can incorporate a scripting language (e.g., a .*js file or a son file).

In certain examples, a client's native application (e.g., ANDROID™ or IOS™ Application) is downloaded on the customer client device 104. In this example, the client's native application including the experience analytics script 114 is programmed in JavaScript leveraging a Software Development Kit (SDK) provided by the experience analytics server system 106. The SDK includes Application Programming Interfaces (APIs) with functions that can be called or invoked by the client's native application.

In one or more embodiments, the experience analytics script 114 is configured to collect activity relating to a client's interaction with the third-party server 108 content through a webpage displayed on the customer client device 104. In one example, the experience analytics script 114 records data including the changes in the interface of the webpage being displayed on the customer client device 104, the elements on the webpage being displayed or visible on the interface of the customer client device 104, the text inputs by the user into the webpage, a movement of a mouse (or touchpad or touch screen) cursor, user scrolls, and mouse (or touchpad or touch screen) clicks on the interface of the webpage. In addition, and with proper user permissions, the experience analytics script 114 may be configured to collect activity data features including, customer client device 104 type, website/application type, customer client device 104 geolocation, customer client device 104 internet protocol (IP) address, uniform resource locators (URLs) accessed by the customer client device 104, customer client device 104 screen resolution, and/or referrer URLs.

The experience analytics script 114 transmits the data to the experience analytics server system 106 via the network 110. In another example, the experience analytics script 114 transmits the data to the third-party server 108 and the data can be transmitted from the third-party server 108 to the experience analytics server system 106 via the network 110. As such, the experience analytics script 114 is configured to collect activity relating to a client's interaction with web server content (e.g., content from the third-party server 108) through a webpage displayed on the customer client device 104.

In one or more embodiments, the experience analytics script 114 may be included within the source code of a webpage, such as the hypertext markup language (HTML) code underlying such a webpage, where such source code is hosted by the third-party server 108 (e.g., web server). Where a user of the customer client device 104 connects to the third-party server 108 and requests to visit a given webpage, the underlying code for the webpage is downloaded to the customer client device 104 and rendered thereupon, including the experience analytics script 114, providing for user interaction with the webpage, as well as for data collection by the experience analytics script 114.

In one or more embodiments, the member client device 102 includes an experience analytics client 112, The experience analytics client 112 is a platform, program, service, or the like, configured to provide help agents, and the like, with the ability to view details of a live session. For example, the experience analytics client 112 is configured to provide user interfaces to display one or more features of a live session, including, without limitation, live session events, historical replay data, and the like, as well as any combination thereof. The experience analytics client 112 may be configured to provide a help agent with a unique per-session view, the unique per-session view corresponding to a single user's current session. The experience analytics client 112 may be configured to provide the unique view upon the help agent's activation of a unique link (e.g., a live session link), where such a unique link may be sent to the member client device 102 upon a user's interaction with a "live support" or similar button or feature, as may be included in a webpage which a user is visiting on the customer client device 104.

The experience analytics client 112 may be further configured to identify, based on the contents of the unique link, one or more relevant live replay data features including, without limitation, live session events, historical recorded events, and the like, and to collect, receive, or otherwise access such data features. Specifically, the experience analytics client 112 may be configured to access live session events by opening a connection to a short-latency queue (SLQ) 124.

In addition, the experience analytics client 112 may be configured to collect or receive data relevant to one or more previous sessions including, as examples and without limitation, session replays, session replay analytics, and the like. The experience analytics client 112 may be configured to provide for collection, receipt, or the like, of such data, as may be relevant to such previous sessions, from one or more sources including, without limitation, the database 300, and the like, as well as any combination thereof.

Following collection, receipt, or the like, of live and historical session data, the experience analytics client 112 provides for displaying user interface(s) with one or more of such data features to a help agent, providing for agent review of current and historical session data. Such presentation, through the member client device 102, provides for short-term view of session data combined with long-term persistent view of session data. In this regard, data exchanged between the experience analytics client 112 and the experience analytics server system 106 may include functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server system 106 supports various services and operations that are provided to the experience analytics client 112. Such operations include transmitting data to and receiving data from the experience analytics client 112. Data exchanges to and from the experience analytics server system 106 are invoked and controlled through functions available via user interfaces (UIs) of the experience analytics client 112.

The experience analytics server system 106 provides server-side functionality via the network 110 to a particular experience analytics client 112. While certain functions of the experience analytics system 100 are described herein as being performed by either an experience analytics client 112 or by the experience analytics server system 106, the location of certain functionality either within the experience analytics client 112 or the experience analytics server system 106 may be a design choice. For example, it may be technically preferable to initially deploy certain technology and functionality within the experience analytics server system 106 but to later migrate this technology and functionality to the experience analytics client 112 where a member client device 102 has sufficient processing capacity.

Turning now specifically to the experience analytics server system 106, an Application Program Interface (API) server 116 is coupled to, and provides a programmatic interface to, application servers 120. The application servers 120 are communicatively coupled to a database server 126, which facilitates access to a database 300 that stores data associated with experience analytics processed by the application servers 120. Similarly, a web server 118 is coupled to the application servers 120, and provides web-based interfaces to the application servers 120. To this end, the web server 118 processes incoming network requests over the Hypertext Transfer Protocol (HTTP) and several other related protocols.

The Application Program Interface (AK) server 116 receives and transmits message data (e.g., commands and message payloads) between the member client device 102 and the application servers 120. Specifically, the Application Program Interface (API) server 116 provides a set of interfaces (e.g., routines and protocols) that can be called or queried by the experience analytics client 112 or the experience analytics script 114 in order to invoke functionality of the application servers 120. The Application Program Interface (API) server exposes to the experience analytics client 112 various functions supported by the application servers 120, including generating information on errors, insights, merchandising information, adaptability information, images, graphs providing visualizations of experience analytics, session replay videos, zoning and overlays to be applied on the website, etc. The application servers 120 host a number of server applications and subsystems, including for example an experience analytics server 122. The experience analytics server 122 implements a number of data processing technologies and functions, particularly related to the aggregation and other processing of data including the changes in the interface of the website being displayed on the customer client device 104, the elements on the website being displayed or visible on the interface of the customer client device 104, the text inputs by the user into the website, a movement of a mouse (or touchpad) cursor and mouse (or touchpad) clicks on the interface of the website, etc. received from multiple instances of the experience analytics script on customer client devices 104. The experience analytics server 122 implements processing technologies and functions, related to generating user interfaces including information on errors, insights, merchandising information, adaptability information, images, graphs providing visualizations of experience analytics, session replay videos, zoning and overlays to be applied on the website, etc. Other processor and memory intensive processing of data may also be performed server-side by the experience analytics server 122, in view of the hardware requirements for such processing.

In one or more embodiments, the experience analytics server 122 is configured to execute instructions for streaming live sessions (e.g., live browsing sessions). As is relevant to the execution of instructions for streaming live sessions, live sessions are real-time or near-real-time representations of user journeys through a webpage or set of webpages, including; users' interactions therewith.

The experience analytics server 122 may be configured to activate a "live mode" or other, similar, program, routine, or the like, in response to the receipt, collection, or the like, of one or more "live mode" trigger commands, instructions, or the like, as may be sent by the experience analytics script 114, as described above. Such "live mode" routines may include, without limitation, increasing session event processing frequency, initiating one or more post-to-SLQ processes, such as may be applicable to the population of the short-latency queue (SLQ) 118 with live replay events and data, and the like.

The SLQ 124 may provide for collection, receipt, or the like, of session events, including session events in the order of collection or receipt. The SLQ 124 is a memory, storage, or other, like, component, configured to provide real-time or near-real-time storage of session events, such as clicks, scrolls, text entries, and the like, in the order in which such session events are generated during a user's session, as well as subsequent retrieval or transmission of such stored events, including in order, in real-time or near-real-time, as described hereinbelow. The SLQ 124 may be configured as a virtual component, as a physical component, or in a hybrid physical-virtual configuration.

In one or more embodiments, the database 300 is configured to archive data permanently or semi-permanently. The database 300 may be configured to store information received from one or more web third-party servers 108 (e.g., based on a request from the experience analytics server 122 to the third-party servers 108 for information, such as webpage content), customer client devices 104, and other, like, components, as well as to store data relevant to the operation of the experience analytics server 122 and any outputs therefrom. The database 300 may be a local system, a remote system, or a hybrid remote-local system. Further, the database 300 may be configured as a fully-physical system, including exclusively physical components, as a virtualized system, including virtualized components, or as a hybrid physical-virtual system. Examples of devices which may be configured as a database 300 in the experience analytics system 100 include, without limitation, local database hardware, cloud storage systems, remote storage servers, other, like, devices, and any combination thereof. Further, the database 300 may be directly connected to the experience analytics server 122, such as without an intermediate connection to the network 110, including via connections similar or identical to those described with respect to the network 110.

In one or more embodiments, the database 300 may be configured to store or otherwise archive data relating to one or more sessions, including, without limitation, user interactions, user sessions, other, like, data, and any combination thereof. Further, the database 300 may be configured to transfer, to and from the experience analytics server 122, data necessary for the execution of the methods described herein, and may store or otherwise archive experience analytics server 122 inputs, experience analytics server 122 outputs, or both.

As an example of a potential use-case involving the experience analytics system 100, as may be relevant to the descriptions provided herein, a user may attempt to access a website to purchase a product. The user may, through the customer client device 104, and a browser app included therein, generate a request to access the website. The request, when received by the third-party server 108, may configure the third-party server 108 to send a copy of webpage(s) of the website to the customer client device 104, including the experience analytics script 114. The database 300 may store a copy of the webpage(s) from the third-party servers 108 (e.g., based on a request from the experience analytics server 122 to the third-party servers 108). The experience analytics server 122 may provide such copy to the customer client device 104. During the course of the customer client's session, the experience analytics script 114 may collect session data and transmit such data to the experience analytics server 122 for storage in the database 300.

In addition, where the user at the customer client device 104 encounters an issue (e.g., an error such a defective checkout button, user confusion, and/or another type of issue), the user may engage a live help support feature (e.g., implemented by the experience analytics server 122), for example, by selecting a chat button. In this regard, the help support feature includes a chat component, which allows a support agent at the member client device 102 to chat with the user at the customer client device 104. Moreover, the help support feature allows the user to connect with the help agent, causing the experience analytics script 114 to employ a script interface (e.g., a Javascript API) to make data available for the member client device 102 (e.g., such that when the live session link/button is pressed, this data is visible to the agent), and to send a live mode trigger to the experience analytics server system 106. Following receipt of the live mode trigger by the experience analytics server system 106, the user's session data may be pushed to the SLQ 124 of the experience analytics server 122, in real-time or near-real-time. The experience analytics server 122 sends the live session link to the member client device 102, where the live session link is selectable by the help agent.

Following a help agent's activation of the live session link, the experience analytics server 122 may be configured to provide live session replay to the member client device 102. For example, the experience analytics server 122 generates a combined SLQ 124 and database data feed, and provides the combined data feed to the help agent at the member client device 102, in real-time or near-real-time, permitting the help agent to view the user's live session, and provide suggestions regarding how the user can better engage with the website. The merging allows the help agent to seek back (e.g., rewind) to view what happened, even before the website visitor at the customer client device 104 pressed the chat button.

System Architecture

Figure 2:
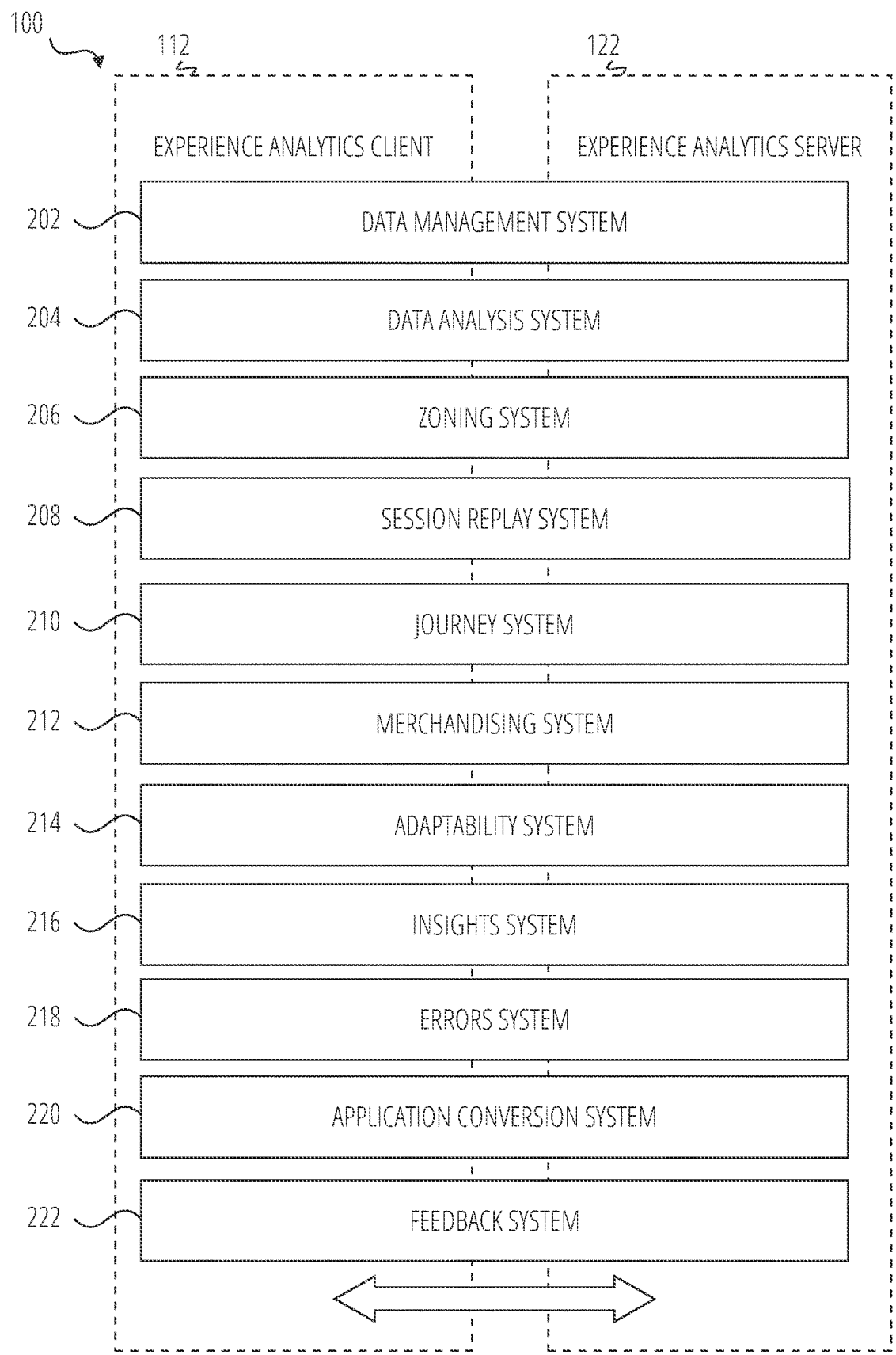
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 112 and the experience analytics server 122. The experience analytics system 100 embodies a number of subsystems, which are supported on the client-side by the experience analytics client 112 and on the server-side by the experience analytics server 122. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the member client devices 102, the experience analytics script 114 executed by each of the customer client devices 104, and the third-party servers 108. The data management system 202 is also responsible for exporting data to the member client devices 102 or the third-party, servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the member client device 102 via the experience analytics client 112. The zoning interface provides a visualization of how the users via the customer client devices 104 interact with each element on the client's website. The zoning interface can also provide an aggregated view of in-page behaviors by the users via the customer client device 104 (e.g., clicks, scrolls, navigation). The zoning interface can also provide a side-by-side view of different versions of the client's website for the client's analysis. For example, the zoning system 206 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 112. The session replay interface includes a session replay that is a video reconstructing an individual user's session (e.g., visitor session) on the client's website. The user's session starts when the user arrives into the client's website and ends upon the user's exit from the client's website. A user's session when visiting the client's website on a customer client device 104 can be reconstructed from the data received from the user's experience analytics script 114 on customer client devices 104. The session replay interface can also include the session replays of a number of different visitor sessions to the client's website within a period of time (e.g., a week, a month, a quarter, etc.). The session replay interface allows the client via the member client device 102 to select and view each of the session replays. In one example, the session replay interface can also include an identification of events (e.g., failed conversions, angry customers, errors in the website, recommendations or insights) that are displayed and allow the user to navigate to the part in the session replay corresponding to the events such that the client can view and analyze the event.

The journey system 210 is responsible for generating the journey interface to be displayed by the member client device 102 via the experience analytics client 112. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 104) to the website, and illustrates the visited pages and in order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 112. The merchandising interface includes merchandising analysis that provides the client with analytics on: the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on conversions (e.g., sales, revenue) associated with a placement or zone in the client website.

The adaptability system 214 is responsible for creating accessible digital experiences for the client's website to be displayed by the customer client devices 104 for users that would benefit from an accessibility-enhanced version of the client's website. For instance, the adaptability system 214 can improve the digital experience for users with disabilities, such as visual impairments, cognitive disorders, dyslexia, and age-related needs. The adaptability, system 214 can, with proper user permissions, analyze the data from the experience analytics script 114 to determine whether an accessibility-enhanced version of the client's website is needed, and can generate the accessibility-enhanced version of the client's website to be displayed by the customer client device 104.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the member client devices 102 via the experience analytics client on a dashboard of a user interface, as a pop-up element, as a separate panel, etc. In this example, the insights system 216 is responsible for generating an insights interface to be displayed by the member client device 102 via the experience analytics client 112. In another example, the insights can be incorporated in another interface such as the zoning interface, the session replay, the journey interface, or the merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that adversely affects (e.g., causes frustration for) the users (e.g., users on customer client devices visiting the client's website). The errors can also include causes of looping behaviors by the users, in-page issues such as unresponsive calls to action and slow loading pages, etc. The errors can be displayed by the member client devices 102 via the experience analytics client on a dashboard of a user interface, as a pop-up element, as a separate panel, etc. In this example, the errors system 218 is responsible for generating an errors interface to be displayed by the member client device 102 via the experience analytics client 112. In another example, the insights can be incorporated in another interface such as the zoning interface, the session replay, the journey interface, or the merchandising interface to be displayed by the member client device 102.

The application conversion system 220 is responsible for the conversion of the functionalities of the experience analytics server 122 as provided to a client's website to a client's native mobile applications. For instance, the application conversion system 220 generates the mobile application version of the zoning interface, the session replay, the journey interface, the merchandising interface, the insights interface, and the errors interface to be displayed by the member client device 102 via the experience analytics client 112. The application conversion system 220 generates an accessibility-enhanced version of the client's mobile application to be displayed by the customer client devices 104.

The feedback system 222 is responsible for receiving and analyzing data from the data management system 202 that includes the feedback data received from the client devices. As the visitor progresses through a client's website on the client device, a feedback webpage of the website, a pop-up window or tab, or an overlay can be displayed to receive the visitor's feedback. For instance, a feedback form can be displayed in a pop-up window or tab of the website, an overlay of the website, one of the plurality of webpages of the website, etc. The visitor can provide feedback on, for example, the functionality of the website, aesthetics of the website, on the goods and services associated with the website, etc. The feedback data can include a text input that is included into a feedback form on the website. The feedback data can also include a survey response, a rating that includes an image, an emoticon, or an icon, a screenshot of one of the plurality of webpages, etc. The feedback system 222 is also responsible for generating feedback interfaces to be displayed by the member client device 102 via the experience analytics client 112. Feedback interface can include the feedback list user interface, the feedback entry detail user interface, and playback user interface.

Data Architecture

Figure 3:
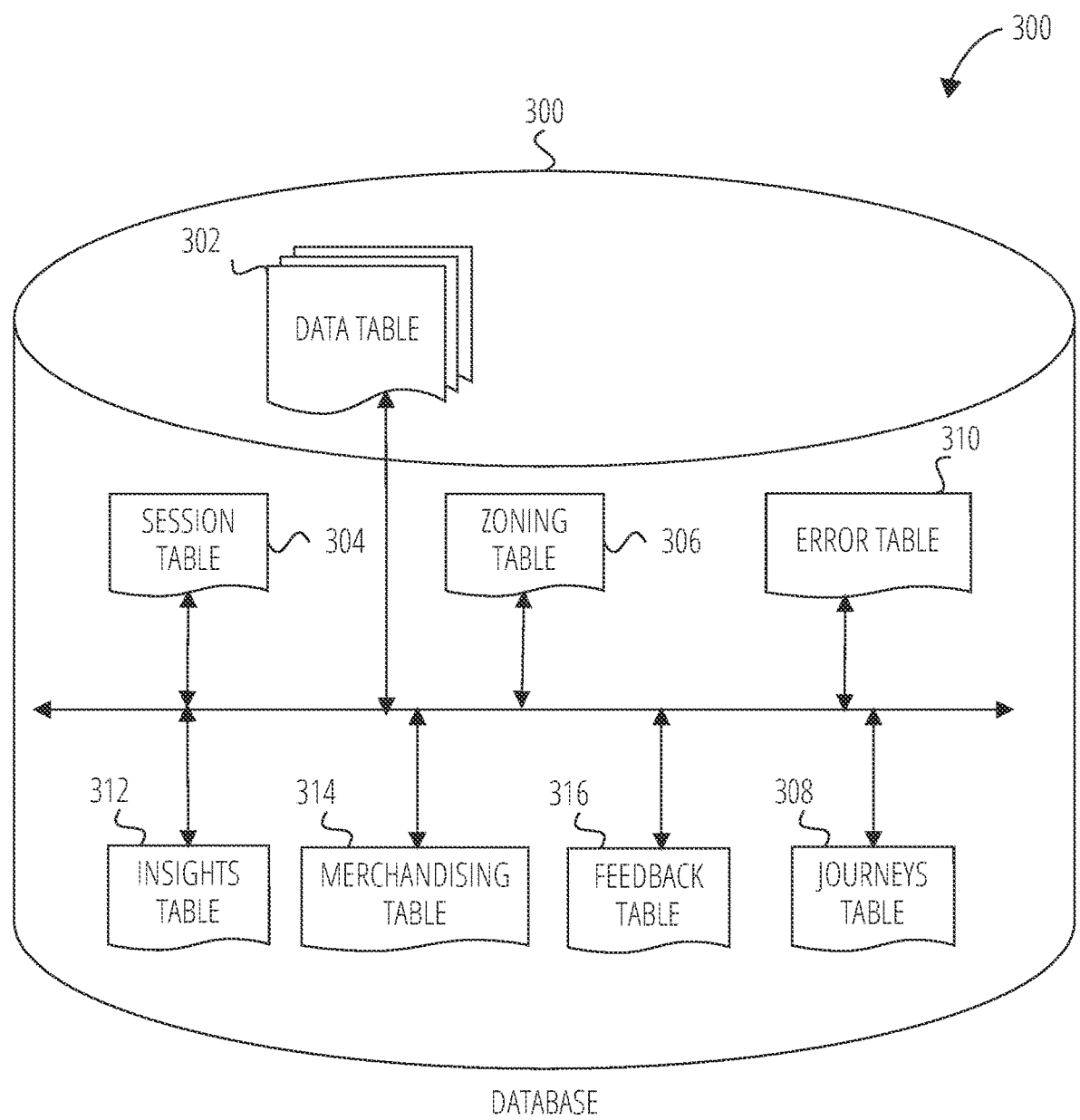
FIG. 3 is a diagrammatic representation of a data structure as maintained in a database, in accordance with some examples.

FIG. 3 is a schematic diagram illustrating database 300, which may be stored in the database 300 of the experience analytics server 122, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 104, the elements on the website being displayed or visible on the interface of the customer client device 104, the text inputs by the user into the website, a movement of a mouse (or touchpad or touch screen) cursor and mouse (or touchpad or touch screen) clicks on the interface of the website, etc. The data table can also store data tags and results of data science and data engineering processes on the data. The data table 302 can also store information such as the font, the images, the videos, the native scripts in the website or applications, etc.

The session table 304 stores session replays for each of the client's websites and native applications. Session replays may include session events associated with browsing sessions. In one or more embodiments, session events correspond to user interactions with one or more elements, sections, zones (e.g., stored in association with the zoning table 306 discussed below), or the like, of a webpage. Examples of session events include, but are not limited to, user input of entering text in a text box, clicking a button with a mouse, tapping a button with a touchscreen, navigating to a webpage, navigating away from a webpage, scrolling up or down on the webpage, hovering over a webpage element, and the like, as well as any combination thereof. Session replay and recording may be executed by generating one or more logs, lists, and the like, of such events (e.g., as detected by an experience analytics script 114) included in a webpage accessed by a user of the customer client device 104. Such logs, lists, and the like may be stored in the session table 304, and may include one or more event descriptors including the event type, the event target, such as a specific button or text box, the event time, and the like, as well as combinations thereof.

The zoning table 306 stores data related to the zoning for each of the client's websites and native applications including the zones to be created and the zoning overlay associated with the websites and native applications. The journeys table 308 stores data related to the journey of each visitor to the client's website or through the native application. The error table stores data related to the errors generated by the errors system 218 and the insights table stores data related to the insights generated by the insights table 312.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities and the performance of the products based on the zones in the website or application, etc.

The feedback table 316 stores data associated with the feedback system 222. For example, the data in the feedback table 316 can include the feedback data received from each of the customer client devices 104 and stored in association with the customer client device 104 and the website associated with the customer client device 104. The feedback data can include, for example, the text input that provides the visitor's (or customer's) feedback on the website, survey response, rating that includes an image, an emoticon, or an icon, a screenshot of one of the plurality of webpages, etc.

Figure 4:
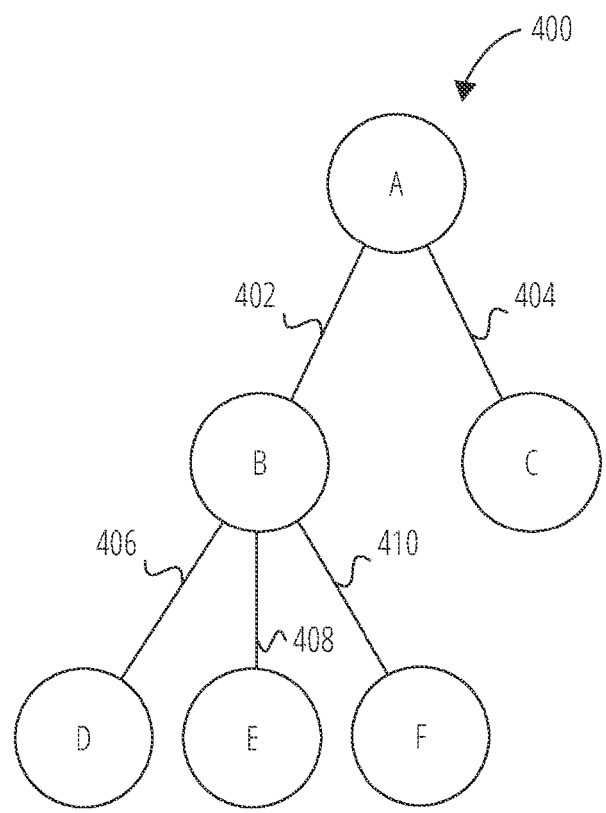
FIG. 4 illustrates an unlabeled document object model (DOM) tree, in accordance with some examples.

FIG. 4 illustrates an unlabeled document object model (DOM) tree 400, in accordance with some examples. In one or more embodiments, the unlabeled DOM tree 400 provides a visual representation of the hierarchical structure of a webpage's HTML code, with content zones or elements (e.g., as defined by the zoning system 206) represented as nodes A-F.

In the example unlabeled DOM tree 400, related nodes A-F are joined by links 402-410, representing the relationships between any two of the nodes A-F. In the example unlabeled DOM tree 400, a link 402 is established between nodes A and B, a link 404 is established between nodes A and C, a link 406 is established between nodes B and D, a link 408 is established between nodes B and E. and a link 410 is established between nodes B and F.

In addition, nodes B and C are disposed on a second tier below the first tier occupied by node A, reflecting a structure in which the content element or zone represented by node A includes the content elements or zones represented by nodes B and C. Moreover, nodes D, E and F are disposed on a third tier below the second tier occupied by node B, reflecting a structure in which the content element or zone represented by node B includes the content elements or zones represented by nodes D, E and F.

Figure 5:
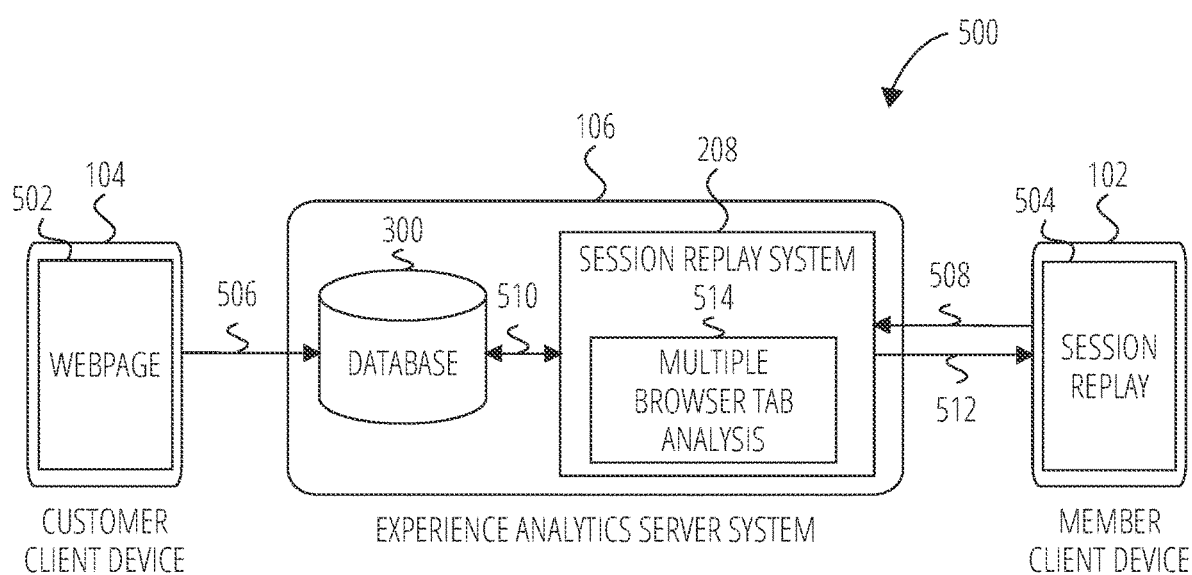
FIG. 5 illustrates an architecture for providing session replay with multiple browser tabs, in accordance with some examples.

FIG. 5 illustrates an architecture 500 for providing session replay with multiple browser tabs, in accordance with some examples. For explanatory purposes, the architecture is primarily described herein with reference to the member client device 102, the customer client device 104 and the experience analytics server system 106 of FIG. 1. However, the architecture 500 may correspond to one or more other components and/or other suitable devices.

In the example of FIG. 5, a user (e.g., customer) at the customer client device 104 accesses a website including a webpage 502. The user interacts with the webpage 502, with such interactions corresponding to session events performed with respect to the webpage 502. As noted above, the session events may include entering text in a text box, clicking a button with a mouse, tapping a button with a touchscreen, scrolling up or down on the webpage 502, hovering over a webpage element, and the like. The session events may correspond to user interactions for the webpage across multiple browser tabs.

In one or more embodiments, the experience analytics script 114 of the customer client device 104 is configured to track the session events. For example, the experience analytics script 114 may be implemented in part as a tracking tag for the webpage 502, for tracking the session events within the webpage 502.

At operation 506, the customer client device 104 provides the session events to a pipeline, for example, in a serialized format. The experience analytics server system 106 is configured to receive the serialized session events, and to store the session events in the database 300.

In the example of FIG. 5, operation 506 corresponds to a first phase which relates to storing session events (e.g., user interactions) for the webpage 502. Moreover, operations 508-512 correspond to a second phase which relates to performing a session replay based on the session events of the webpage 502. It may be understood that the second phase may occur at the same time or virtually the same time after the first phase (e.g., real-time session replay), or after a period of time after the first phase (e.g., non-real time session replay).

Regarding the second phase, a member user at the member client device 102 may request (e.g., via user input) to perform a session replay 504 of the session events for the webpage 502. In response, the member client device 102 provides a request to the experience analytics server system 106 for the session replay 504 (operation 508), In response to the receiving the request, the session replay system 208 accesses the serialized session events stored in the database 300 (operation 510).

Moreover, the experience analytics server system 106 in conjunction with the session replay system 208 provides for unserializing the session events. At operation 512, the session replay system 208 provides for presenting the session replay 504 on the member client device 102. In other words, the session, as it occurred on the customer client device 104, is reconstructed and replayed using the session data stored in the session table 304 of the database 300. Session events collected from the session table 304 of the database 300 may include, but are not limited to, button presses, text entries, and the like, and combinations thereof, and may span multiple browser tabs.

The reconstructed session displays the webpage 502 and corresponding interactions, as they originally occurred on the customer client device 104. The session is reconstructed using data features included in the session data. Such data features may correspond to DOM elements and DOM elements changes, for example, as discussed above with respect to FIG. 4. Thus, the reconstructed session may be generated by rendering such elements.

According to example embodiments, no actual video stream (e.g., video recording, live stream) is sent from the customer client device 104 to the member client device 102. Moreover, the reconstructed session from captured events requires less bandwidth as DOM elements and captured events (e.g., mouse clicks) are transmitted from the customer client device 104 to the member client device 102, instead of a video stream.

In one or more embodiments, the session replay corresponds to a live stream of the session events as they occur on the customer client device 104 (e.g., real-time session replay). As noted above, the experience analytics server system 106 includes an SLQ 124 configured to provide real-time or near-real-time storage of session events (e.g., clicks, scrolls, text entries, and the like) in the order in which such session events are generated during a user's session, as well as subsequent retrieval or transmission of such stored events, including in order, in real-time or near-real-time, as described hereinbelow.

Thus, while not shown in the example of FIG. 5, the operation 510 may correspond to retrieving session events from the database 300 and/or the SLQ 124, and combining the session events to provide for session replay in real-time. In such cases, the experience analytics server generates one or more combined data feeds, which includes the combination of SLQ data with recorded data, and provides the one or more combined data feeds to the experience analytics client 112 running on the member client device 102. The combined data feeds may include SLQ data features, such as low-to-no-latency representations of session events, as well as recorded data features, such as recordings of events which occurred during previous sessions. The combined data feed may include a combination of real-time or near-real-time session events with historical, recorded session events, providing for, as examples and without limitation, manual comparison of current and historical session events. It is noted this is an example embodiment that relates to real-time session replay. However, it is possible to perform non-real time session replay based on the pre-recorded session as stored in the database 300.

Thus, based on the data feed (e.g., a pre-recorded session as stored in the database 300 for non-real time session replay, or a live-streaming session based on data feeds from the SLQ and the database 300 for real-time session replay), the experience analytics client 112 running on the member client device 102 provides the session replay 504 (operation 512).

As described herein, the session replay system 208 includes a multiple browser tab analysis module 514, which is configured to provide for session replay for a webpage based on session events spanning multiple browser tabs. In one or more embodiments, the multiple browser tab analysis module 514 is configured to determine, based on the session events and for each browser tab, a set of in-focus time periods during which user interaction was focused, on the browser tab relative to other browser tabs of the plural browser tabs. The multiple browser tab analysis module 514 is further configured to consolidate, for the sets of in-focus time periods, session events of the plural session events into chronological order. The consolidated session events correspond to a single stream of in-focus activity for the browsing session across the plural browser tabs. In this manner, the multiple browser tab analysis module provides for accurate session replay, even in cases where the session events are across multiple browser tabs during a browsing session.

Moreover, for each browser tab, the multiple browser tab analysis module 514 is configured to determine, based on the plural session events, a set of out-of-focus time periods during which user interaction was not focused on the browser tab. The multiple browser tab analysis module 514 combines, for the determined set of out-of-focus time periods, session events of the plural session events into a single point of time for the browser tab. In addition, the multiple browser tab analysis module 514 adds the combined session events to a respective in-focus time period for the browser tab. In this manner, the multiple browser tab analysis module 514 provides for retaining background events (e.g., DOM mutations, dynamic stylesheet changes, and the like).

Presentation of the session replay 504 may include display of one or more visual, textual, or other, like representations of the user's session with respect to the webpage 502. As described above, the operator of the member client device 102 may be a help agent attempting to assist a site visitor at the customer client device 104 with an issue (e.g., web error caused by a defective website element, user confusion, and/or another type of user issue). The session may be displayed on the member client device 102 by transmitting the session events (e.g., corresponding to a prior session or a live session), thereby providing for session analysis by the operator (e.g., the help agent).

While the example of FIG. 5 is described herein with respect to session replay for multiple browser tabs, the experience analytics system 100 is not limited to such. As noted above, the experience analytics system 100 is also configured to perform zoning analysis and present zoning metrics (e.g., as overlays on webpage elements) with respect to session events stored in the database 300 and/or the SLQ 124. In this regard, while the example of FIG. 5 depicts a single customer client device 104, it is possible that the experience analytics server system 106 provides for aggregating session events (e.g., serialized session events) from multiple customer client devices 104. The aggregated data is stored in the database 300, and is usable by the zoning system 206 and/or the session replay system 208 to present session replay with respect to the plural customer client devices 104. In addition, the experience analytics server system 106 may provide a user interface for a member at the member client device 102 to specify a time period (e.g., the last day, week, month, or specified date range) for presenting the session replay 504 and/or determining the zoning metrics.

Figure 6:
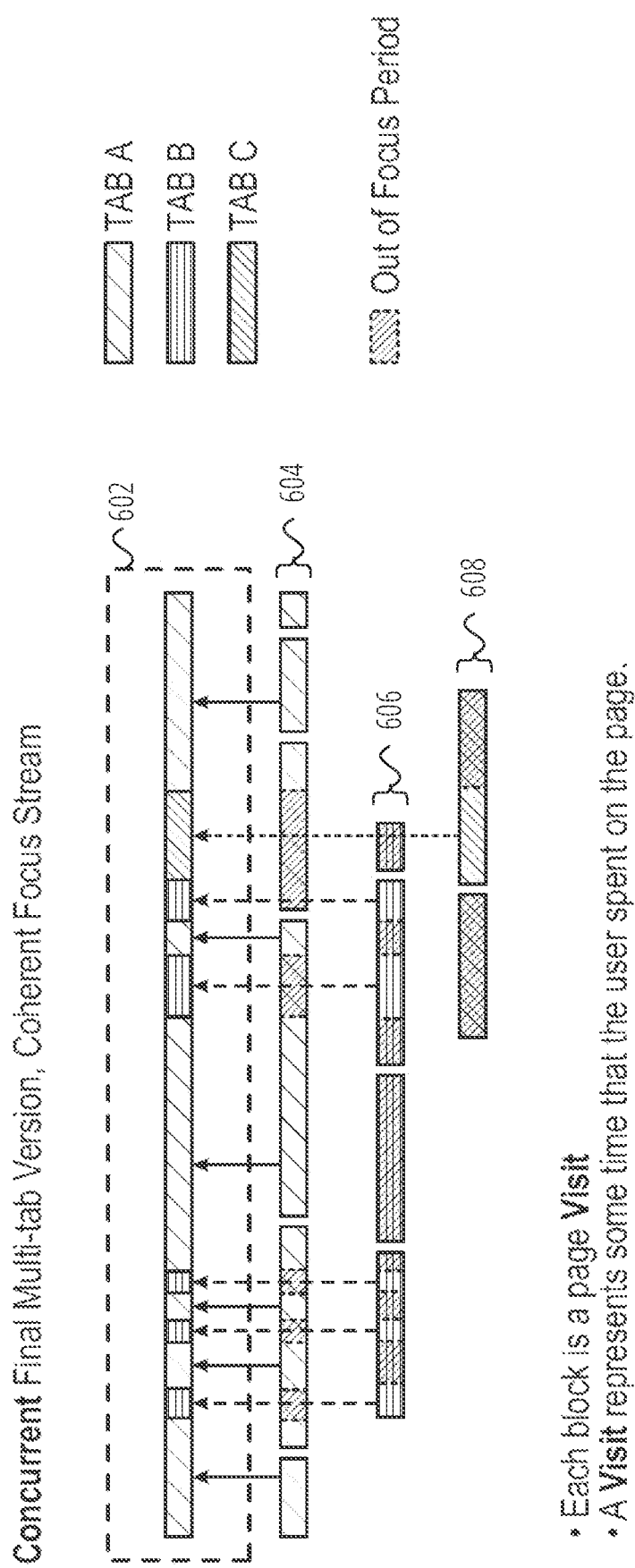
FIG. 6 illustrates an example concurrent composition strategy for consolidating session events that occurred across multiple browser tabs, in accordance with some examples.

FIG. 6 illustrates an example concurrent composition strategy 600 for consolidating session events that occurred across multiple browser tabs, in accordance with some examples. For example, the concurrent composition strategy 600 is implemented by the multiple browser tab analysis module 514 of FIG. 5. The example of FIG. 6 depicts session events 604-608 which correspond to user interactions performed with respect to tabs A-C. In particular, the session events 604 correspond to user interaction for tab A, the session events 606 correspond to user interaction for tab B, and the session events 608 correspond to user interaction for tab C.

User interaction with a given browser tab (e.g., any of tabs A-C) may include in-focus time periods during which a user actually interacted with the given browser tab, and out-of-focus time periods during which the user did not interact with the given browser tab. In one or more embodiments, the in-focus time periods are mutually exclusive across browser tabs, such that the in-focus time periods for a particular browser tab (e.g., tab A) corresponds with out-of-focus time periods for the remaining browser tabs (e.g., tabs B-C). Thus, the concurrent composition strategy 600 of FIG. 6 provides for selecting in-focus time periods, during which the user actually interacted with a browser tab, and piecing them together into a single stream of in-focus activity 602.

In one or more embodiments, the concurrent composition strategy 600 (e.g., as implemented by the multiple browser tab analysis module 514) provides for selecting in-focus time periods for each of the tabs A-C, It is noted that in-focus time periods can span multiple visits (e.g., where a "visit" corresponds to a user visiting a tab), cut across through visits, or be fully contained within one visit.

As described herein, the multiple browser tab analysis module 514 is configured to perform clipping with respect to each of the streams of session events 604-608 respectively corresponding to tabs A-C. As described herein, such clipping may correspond to cutting the respective stream of events at two points and selecting the resulting portion as a clip of the original stream of events. The multiple browser tab analysis module 514 is configured to perform two distinct types of clipping, namely clipping a browser tab (e.g., as a sequence of visits), and clipping a visit (e.g., as a sequence of events).

Moreover, the multiple browser tab analysis module 514 is configured to retain background events for out-of-focus time periods. While background events during out-of-focus time periods may not directly be shown during a session replay, such events may potentially-include important information that happened in the background, such as DOM mutations or dynamic stylesheet changes. It is noted that these mutations are sequential in nature. As such, a missing background event may adversely affect subsequent background events during reconstruction of background events.

As such, a similar process of clipping a browser tab (e.g., which may imply clipping a visit) for in-focus time periods may also be used to identify and select the out-of-focus time periods. In such cases, the mutations are retained, flattened at a single point in time, and included at the very beginning of the next in-focus time period for the browser tab. Thus, the mutation continuity and retention is achieved, while omitting unneeded, additional time for the background events. In this manner, it is possible to effectively remove out-of-focus time periods (e.g., that otherwise appear as inactivity when in fact the user was indeed active but on a different tab), while retaining the important background events.

In one or more embodiments, the multiple browser tab analysis module 514 implements different steps/algorithms in order to provide for session replay with multiple tabs. The steps/algorithms include: (1) inferring in-focus time periods by examining events, (2) collecting divisive focus requests, (3) consolidating focus requests by ensuring boundaries, (4) orchestrating focus selection by alternatively clipping tabs, (5) clipping a browser tab as a sequence of visits, (6) clipping a visit as a sequence of events, (7) coordinating out-of-focus retention, (8) employing content matching, and (9) relative timing normalization.

Step (1) of inferring in-focus time periods by examining events is based on analysis of session events recorded in the session table 304. During the recording of session events, the experience analytics server 122 may receive multiple consecutive batches of mixed session events. In one or more embodiments, every batch is marked with a page_visit_key (e.g., which indicates the web page) and a browser tab_id (e.g., which indicates the browser tab). In this way, the multiple browser tab analysis module 514 is able to determine how to separate events for a webpage by browser tab.

The multiple browser tab analysis module 514 is configured to associate predefined types of session events that happened on a particular browser tab (e.g., one of the browser tabs A-C) as being in-focus for that browser tab. By way of non-limiting example, such predefined types of session events include: a mouse click event (e.g., mouse_click), a key press event (e.g., key_press), an input change event (e.g., input_change), a viewport scroll event (e.g., viewport_scroll), and a select change event (e.g., select_change).

Thus, when a session event of a predefined type is encountered for a browser tab, the multiple browser tab analysis module 514 is configured to set a. "focus request" value for that browser tab, to indicate that the browser tab gained user-focus at a specific point in time for the webpage.

In one or more embodiments, step (1) will result in multiple focus requests, which will likely be redundant. It is noted that redundancy, in this case, cannot be inferred from a single event by itself. Rather, it is based on whether or not a previous focus request occurred on a different tab.

Regarding step (2) of collecting divisive focus requests, the multiple browser tab analysis module 514 provides for ordering focus requests chronologically by the timestamps of their underlying events. In one or more embodiments, a focus request is considered redundant if it is preceded chronologically by another focus request that has the same browser tab_id. This is because the focus request itself does not imply an actual change in focus. The surviving requests can be considered divisive because they imply a meaningful division of focus across browser tabs.

With respect to step (3) of consolidating focus requests by ensuring boundaries, the multiple browser tab analysis module 514 provides for completing the focus request list by, deducing its extremities. In this manner, it is possible to pair requests such that they cover all portions of activity that should be included in a session replay.

In some instances, the first tab that the user saw may not actually have a focus-worthy event (e.g., corresponding to one of the above predefined types) at its very start. Conversely, the last tab that the user saw may not have a focus-worthy event exactly at the end of the session.

As such, the multiple browser tab analysis module 514 is configured to set the starting point of the earliest browser tab visit as the first focus request. Moreover, given the last tab to focus on, the multiple browser tab analysis module 514 is configured to set the ending time of its latest visit. This is considered the last focus request onto a null tab. Thus, this may correspond to requesting focus outside of a recording (e.g., at the very end). In this matter, the list of focus requests is complete by properly being capped, thereby ensuring recording validity even if there is little to no focus or activity.

Regarding step (4) of orchestrating focus selection by alternatively clipping tabs, the main logic of the algorithm (e.g., as implemented by the multiple browser tab analysis module 514) relates to coordination of clipping. This may be viewed as a merging of multiple parallel tabs into one coherent shorter one. The goal is to follow the previously-established focus requests and select or clip the browser tabs accordingly.

Initially, the focus requests are paired up two-by-two, such that each pair represents a period of being in-focus, with a focus-start and a focus-end, respectively. Each pair will then invoke the clipping of the browser tab (e.g., one of browser tabs A-C) in question, at exactly the timestamps of the underlying requests. The resulting clip of the browser tab, which is still a sequence of visits, will be added to the final list of coherent visits.

As such, this algorithm as implemented by the multiple browser tab analysis module also clips the "gap periods" between the in-focus time periods. The resulting clip, in this case, will be forwarded to the retaining logic so that it can be properly preserved into the upcoming legitimate clip.

With respect to step (5) of clipping a browser tab as a sequence of visits, it is noted that a browser tab is simply a collection of visits. Thus, the act of clipping a browser tab at two distinct points in time implies: selecting all the visits that reside fully within the clip period; selecting the leading and trailing visits of the clip period, deducing if they need to be cut across, and clipping them further if needed; and ignoring any visits that are completely out of bounds. In one or more embodiments, the reason why the leading/trailing visits may need further clipping is that the user could begin/end their focus in the middle of a visit.

Regarding step (6) of clipping a visit as a sequence of events, it is noted that similar to a browser tab, a visit is a sequence as well, but one of events. In this case, clipping only requires picking the events that lie within the clip bounds, since events are simply points in time rather than periods of time.

The multiple browser tab analysis module 514 provides for constructing a new artificial visit based on the original one, only containing the relevant events. The page content and web resources will be copied over as is, and the absolute timestamp boundaries of the visit will be altered to match the clip period.

With respect to step (7) of coordinating out-of-focus retention, it is noted that the retention of background browser events happens in the context of two collections of visits: the source visits and the target visits. The multiple browser tab analysis module 514 provides for preserving events that qualify for retention from the source to the matching target visits. By way of non-limiting example, the events that fall under this category include mutation, inserted rule, deleted rule, and adopted style sheets.

Besides being a sequence of events, a visit also holds the actual DOM content that the events should be applied upon. In order to match source visits match with target visits, the multiple browser tab analysis module 514 is configured to use the underlying content identifier. Thus, for any given source visit, if a target visit has the same content identifier as that of the source visit, the qualifying events will be retained as described. If there are multiple such occurrences for a certain content identifier, they will be retained consecutively. The actual retaining is performed by placing the session events at the beginning of their matching target visit. In particular, the multiple browser tab analysis module 514 sets the absolute timestamps for such session events to the start timestamp of the visit.

Regarding step (8) of employing content matching, it is noted that this matching operation may be needed is due to the nature of single page applications. Single page applications tend to start from the same initial content, while continuously generating visits (e.g., URI-changes) with large DOM mutations that effectively represent a different page. In addition, second, back-forward cache can sometimes occur on the client-side, thus increasing the possibility of having two visits with the same content that are not near each other. Moreover, any artificial visits (if applicable) that originate from the same visit will also be naturally matched, since they share the same underlying content per the visit clipping mechanism.

With respect to step (9) of relative timing normalization, it is noted that steps (1)-(8) may lead to rearrangements and time slicing. The multiple browser tab analysis module 514 provides for preserving the integrity of the relative time fields of both visits and events. In one or more embodiments, the multiple browser tab analysis module 514 provides for: making the start_time fields of visits, relative to the absolute start timestamp of the first visit in the final coherent stream; and within one visit, making the time fields of all events relative to the absolute start timestamp of the parent visit.

Figure 7:
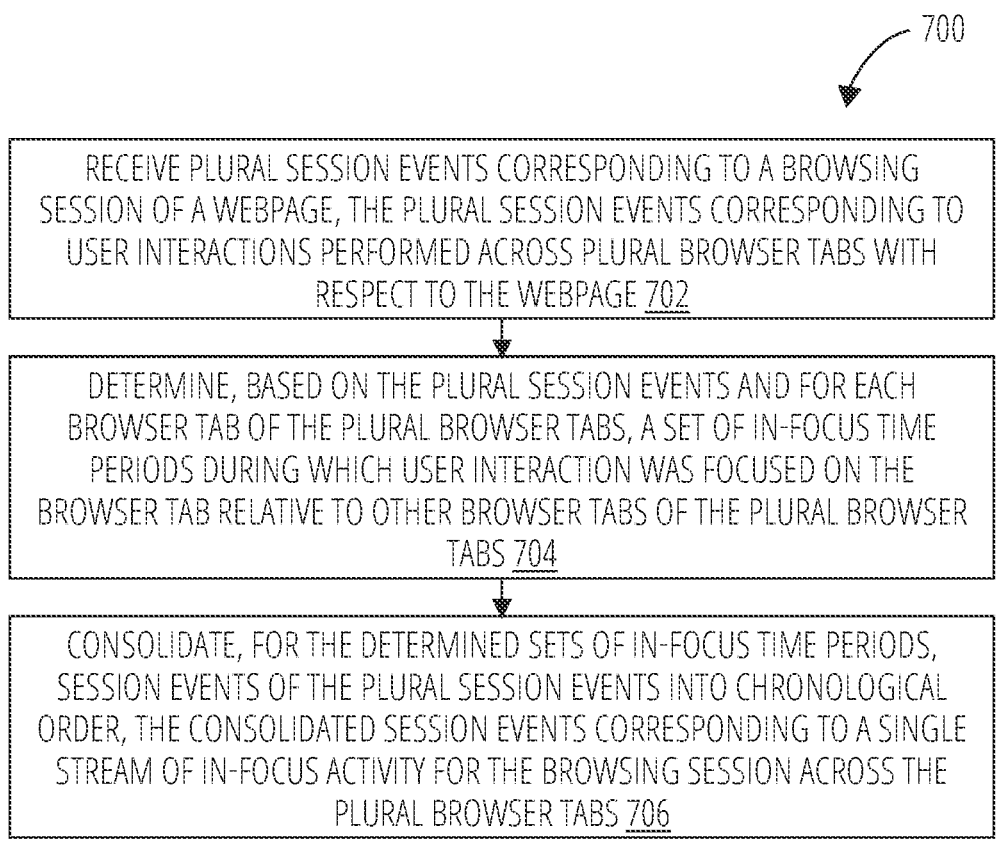
FIG. 7 is a flowchart illustrating a process for providing session replay with multiple browser tabs, in accordance with some examples.

FIG. 7 is a flowchart illustrating a process 700 for providing session replay with multiple browser tabs, in accordance with some examples. For explanatory purposes, the process 700 is primarily described herein with reference to the experience analytics server 122 of FIG. 1. However, one or more blocks (or operations) of the process 700 may be performed by one or more other components, and/or by other suitable devices. Further for explanatory purposes, the blocks (or operations) of the process 700 are described herein as occurring in serial, or linearly. However, multiple blocks (or operations) of the process 700 may occur in parallel or concurrently. In addition, the blocks (or operations) of the process 700 need not be performed in the order shown and/or one or more blocks (or operations) of the process 700 need not be performed and/or can be replaced by other operations. The process 700 may be terminated when its operations are completed. In addition, the process 700 may correspond to a method, a procedure, an algorithm, etc.

The experience analytics server 122 receives plural session events corresponding to a browsing session of a webpage, the plural session events corresponding to user interactions performed across plural browser tabs with respect to the webpage (block 702). The experience analytics server 122 may receive a respective tab identifier to identify each of the plural browser tabs, and receive a page visit key to indicate the webpage.

The experience analytics server 122 determines, based on the plural session events and for each browser tab of the plural browser tabs, a set of in-focus time periods during which user interaction was focused on the browser tab relative to other browser tabs of the plural browser tabs (block 704). The user interaction that was focused on the browser tab corresponds to at least one of a mouse click event, a key press event, an input change event, a viewport scroll event, or a select change event performed with respect to the browser tab.

For each browser tab of the plural browser tabs, the set of in-focus time periods may be determined at least in part by clipping with respect to a sequence of visits for the browser tab. Alternatively or in addition, for each browser tab of the plural browser tabs, the set of in-focus time periods may be determined at least in part by clipping with respect to a sequence of events for the browser tab. The sets of in-focus time periods may be mutually exclusive for the plural browser tabs.

The experience analytics server 122 consolidates, for the determined sets of in-focus time periods, session events of the plural session events into chronological order, the consolidated session events corresponding to a single stream of in-focus activity for the browsing session across the plural browser tabs (block 706).

For each browser tab of the plural browser tabs, the experience analytics server 122 may: determine, based on the plural session events, a set of out-of-focus time periods during which user interaction was not focused on the browser tab; combine, for the determined set of out-of-focus time periods, session events of the plural session events into a single point of time for the browser tab; and add the combined session events to a respective in-focus time period for the browser tab.

Machine Architecture

Figure 8:
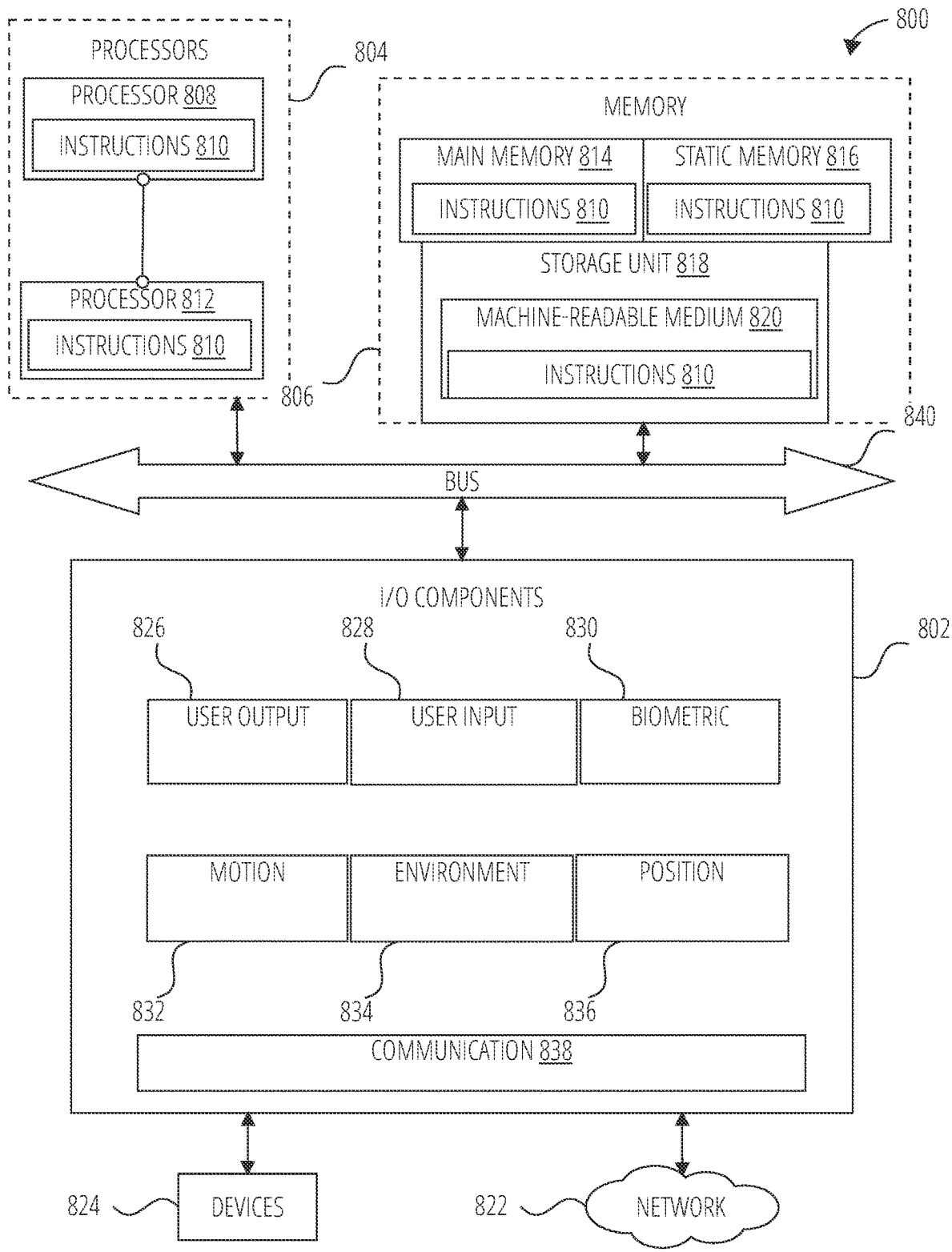
FIG. 8 is a diagrammatic representation of a machine in the form of a computer system within which a set of instructions may be executed for causing the machine to perform any one or more of the methodologies discussed herein, in accordance with some examples.

FIG. 8 is a diagrammatic representation of the machine 800 within which instructions (e.g., software, a program, an application, an apples, an application, or other executable code) for causing the machine 800 to perform any one or more of the methodologies discussed herein may be executed. For example, the instructions 810 may cause the machine 800 to execute any one or more of the methods described herein. The instructions 810 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a browser tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while only a single machine 800 is illustrated, the term "machine" shall also be taken to include a collection of machines that individually or jointly execute the instructions 810 to perform any one or more of the methodologies discussed herein. The machine 800, for example, may comprise the member client device 102 or any one of a number of server devices forming part of the experience analytics server 122. In some examples, the machine 800 may also comprise both client and server systems, with certain operations of a particular method or algorithm being performed on the server-side and with certain operations of the particular method or algorithm being performed on the client-side.

The machine 800 may include processors 804, memory 806, and input/output I/O components 802, which may be configured to communicate with each other via a bus 840. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 808 and a processor that execute the instructions 810. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single-core, a single processor with multiple cores (e.g., a multi-core processor), multiple processors with a single core, multiple processors with multiples cores, or any combination thereof.

The memory 806 includes a main memory 814, a static memory 816, and a storage unit 818, both accessible to the processors 804 via the bus 840. The main memory 806, the static memory 816, and storage unit 818 store the instructions 810 embodying any one or more of the methodologies or functions described herein. The instructions 810 may also reside, completely or partially, within the main memory 814, within the static memory 816, within machine-readable medium 820 within the storage unit 818, within at least one of the processors 804 (e.g., within the processor's cache memory), or any suitable combination thereof, during execution thereof by the machine 800.

The I/O components 802 may include a wide variety of components to receive input, provide output, produce output, transmit information, exchange information, capture measurements, and so on. The specific I/O components 802 that are included in a particular machine will depend on the type of machine. For example, portable machines such as mobile phones may include a touch input device or other such input mechanisms, while a headless server machine will likely not include such a touch input device. It will be appreciated that the I/O components 802 may include many other components that are not shown in FIG. 8. In various examples, the I/O components 802 may include user output components 826 and user input components 828. The user output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 802 may include biometric components 830, motion components 832, environmental components 834, or position components 836, among a wide array of other components. For example, the biometric components 830 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 832 include acceleration sensor components (e.g., accelerometer), gravitation sensor components, rotation sensor components (e.g., gyroscope).

The environmental components 834 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the member client device 102 may have a camera system comprising, for example, front cameras on a front surface of the member client device 102 and rear cameras on a rear surface of the member client device 102. The front cameras may, for example, be used to capture still images and video of a user of the member client device 102 (e.g., "selfies"). The rear cameras may, for example, be used to capture still images and videos in a more traditional camera mode. In addition to front and rear cameras, the member client device 102 may also include a 360° camera for capturing 360° photographs and videos.

Further, the camera system of a member client device 102 may include dual rear cameras (e.g., a primary camera as well as a depth-sensing camera), or even triple, quad or penta rear camera configurations on the front and rear sides of the member client device 102. These multiple cameras systems may include a wide camera, an ultra-wide camera, a telephoto camera, a macro camera and a depth sensor, for example.

The position components 836 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 802 further include communication components 838 operable to couple the machine 800 to a network 822 or devices 824 via respective coupling or connections. For example, the communication components 838 may include a network interface component or another suitable device to interface with the network 822. In further examples, the communication components 838 may include wired communication components, wireless communication components, cellular communication components. Near Field Communication (NFC) components, Bluetooth® components (e.g., Bluetooth® Low Energy), Wi-Fi® components, and other communication components to provide communication via other modalities. The devices 824 may be another machine or any of a wide variety of peripheral devices (e.g., a peripheral device coupled via a USB).

Moreover, the communication components 838 may detect identifiers or include components operable to detect identifiers. For example, the communication components 838 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 838, such as location via Internet Protocol (IP) geolocation, location via Wi-Fi® signal triangulation, location via detecting an NFC beacon signal that may indicate a particular location, and so forth.

The various memories (e.g., main memory 814, static memory 816, and memory of the processors 804) and storage unit 818 may store one or more sets of instructions and data structures (e.g., software) embodying or used by any one or more of the methodologies or functions described herein. These instructions (e.g., the instructions 810), when executed by processors 804, cause various operations to implement the disclosed examples.

The instructions 810 may be transmitted or received over the network 822, using a transmission medium, via a network interface device (e.g., a network interface component included in the communication components 838) and using any one of several well-known transfer protocols (e.g., hypertext transfer protocol (HTTP)). Similarly, the instructions 810 may be transmitted or received using a transmission medium via a coupling (e.g., a peer-to-peer coupling) to the devices 824.

Software Architecture

Figure 9:
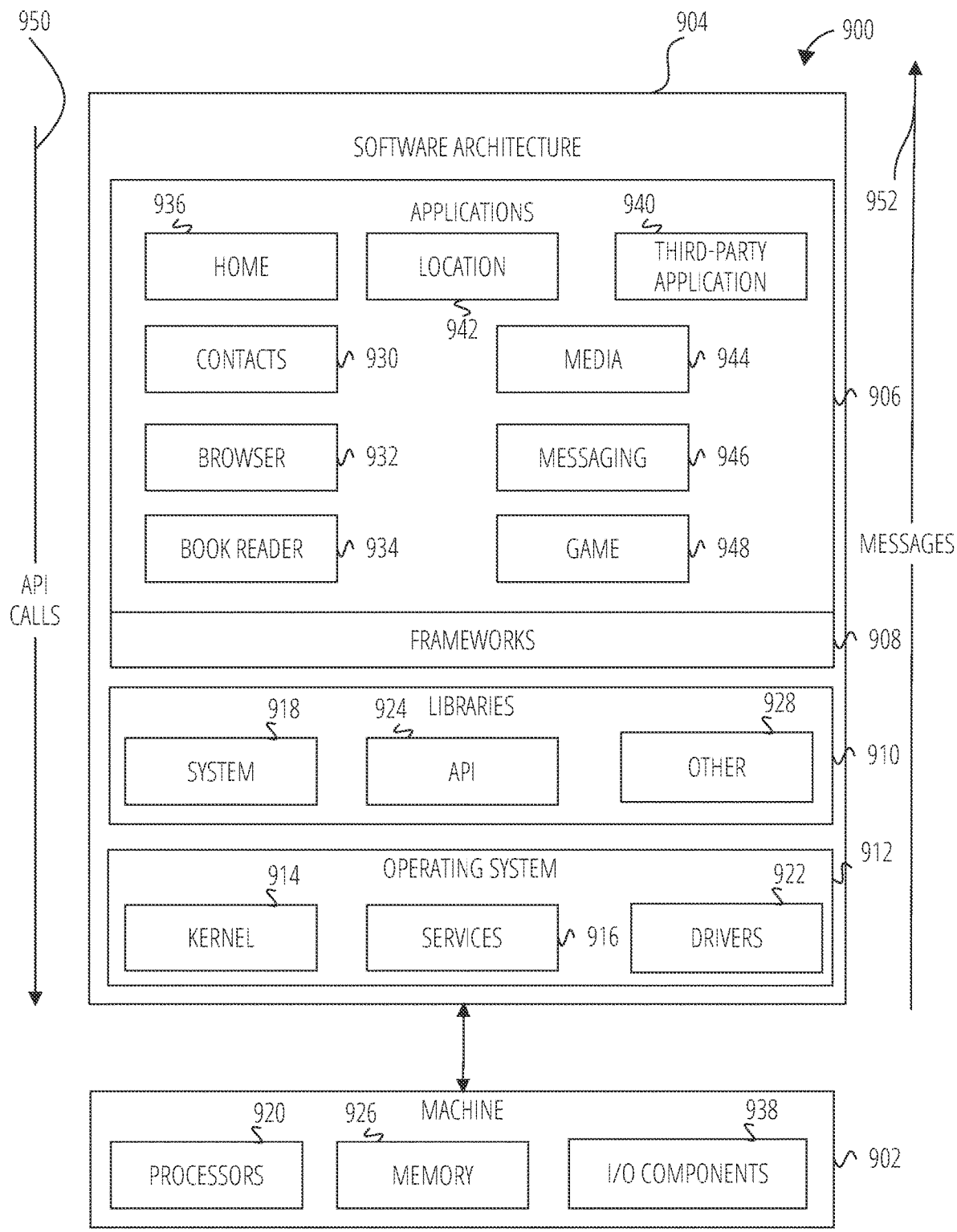
FIG. 9 is a block diagram showing a software architecture within which examples may be implemented.

FIG. 9 is a block diagram 900 illustrating a software architecture 904, which can be installed on any one or more of the devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionality. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 910 provide a common low-level infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a common high-level infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example, the applications 906 may include a home application 936, a contacts application 930, a browser application 932, a book reader application 934, a location application 942, a media application 944, a messaging application 946, a game application 948, and a broad assortment of other applications such as a third-party application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SLK) by an entity other than the vendor of the particular platform) may be mobile software running on a mobile operating system such as IOS™; ANDROID™ WINDOWS® Phone, or another mobile operating system. In this example, the third-party application 940 can invoke the API calls 950 provided by the operating system 912 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (AMC), A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/ 'modulated data signals. The terms "machine-readable medium," "computer-readable medium" and "device-readable medium" mean the same thing and may be used interchangeably, in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
   receiving plural session events corresponding to a browsing session of a webpage, the plural session events corresponding to user interactions performed across plural browser tabs with respect to the webpage;
   determining, based on the plural session events and for each browser tab of the plural browser tabs, a set of in-focus time periods during which user interaction was focused on the browser tab relative to other browser tabs of the plural browser tabs; and
   consolidating, for the determined sets of in-focus time periods, session events of the plural session events into chronological order, the consolidated session events corresponding to a single stream of in-focus activity for the browsing session across the plural browser tabs.

2. The method of claim 1, further comprising, for each browser tab of the plural browser tabs:
   determining, based on the plural session events, a set of out-of-focus time periods during which user interaction was not focused on the browser tab;
   combining, for the determined set of out-of-focus time periods, session events of the plural session events into a single point of time for the browser tab; and
   adding the combined session events to a respective in-focus time period for the browser tab.

3. The method of claim 1, wherein, for each browser tab of the plural browser tabs, the set of in-focus time periods is determined at least in part by clipping with respect to a sequence of visits for the browser tab.

4. The method of claim 1, wherein, for each browser tab of the plural browser tabs, the set of in-focus time periods is determined at least in part by clipping with respect to a sequence of events for the browser tab.

5. The method of claim 1, further comprising:
receiving a respective tab identifier to identify each of the plural browser tabs; and
receiving a page visit key to indicate the webpage.

6. The method of claim 1, wherein the user interaction that was focused on the browser tab corresponds to at least one of a mouse click event, a key press event, an input change event, a viewport scroll event, or a select change event performed with respect to the browser tab.

7. The method of claim 1, wherein the sets of in-focus time periods are mutually exclusive for the plural browser tabs.

8. A system comprising:
a processor; and
a memory storing instructions that, when executed by the processor, configure the processor to perform operations comprising:
receiving plural session events corresponding to a browsing session of a webpage, the plural session events corresponding to user interactions performed across plural browser tabs with respect to the webpage;
determining, based on the plural session events and for each browser tab of the plural browser tabs, a set of in-focus time periods during which user interaction was focused on the browser tab relative to other browser tabs of the plural browser tabs; and
consolidating, for the determined sets of in-focus time periods, session events of the plural session events into chronological order, the consolidated session events corresponding to a single stream of in-focus activity for the browsing session across the plural browser tabs.

9. The system of claim 8, the operations further comprising, for each browser tab of the plural browser tabs:
determining, based on the plural session events, a set of out-of-focus time periods during which user interaction was not focused on the browser tab;
combining, for the determined set of out-of-focus time periods, session events of the plural session events into a single point of time for the browser tab; and
adding the combined session events to a respective in-focus time period for the browser tab.

10. The system of claim 8, wherein, for each browser tab of the plural browser tabs, the set of in-focus time periods is determined at least in part by clipping with respect to a sequence of visits for the browser tab.

11. The system of claim 8, wherein, for each browser tab of the plural browser tabs, the set of in-focus time periods is determined at least in part by clipping with respect to a sequence of events for the browser tab.

12. The system of claim 8, the operations further comprising:
receiving a respective tab identifier to identify each of the plural browser tabs; and
receiving a page visit key to indicate the webpage.

13. The system of claim 8, wherein the user interaction that was focused on the browser tab corresponds to at least one of a mouse click event, a key press event, an input change event, a viewport scroll event; or a select change event performed with respect to the browser tab.

14. The system of claim 8, wherein the sets of in-focus time periods are mutually exclusive for the plural browser tabs.

15. A non-transitory computer-readable storage medium, the computer-readable storage medium including instructions that when executed by a computer, cause the computer to perform operations comprising:
receiving plural session events corresponding to a browsing session of a webpage, the plural session events corresponding to user interactions performed across plural browser tabs with respect to the webpage;
determining, based on the plural session events and for each browser tab of the plural browser tabs, a set of in-focus time periods during which user interaction was focused on the browser tab relative to other browser tabs of the plural browser tabs; and
consolidating, for the determined sets of in-focus time periods, session events of the plural session events into chronological order, the consolidated session events corresponding to a single stream of in-focus activity for the browsing session across the plural browser tabs.

16. The non-transitory computer-readable storage medium of claim 15, the operations further comprising, for each browser tab of the plural browser tabs:
determining, based on the plural session events, a set of out-of-focus tune periods during which user interaction was not focused on the browser tab;
combining, for the determined set of out-of-focus time periods, session events of the plural session events into a single point of time for the browser tab; and
adding e combined session events to a respective in-focus time period for the browser tab.

17. The non-transitory computer-readable storage medium of claim 15, wherein, for each browser tab of the plural browser tabs, the set of in-focus time periods is determined at least in part by clipping with respect to a sequence of visits for the browser tab.

18. The non-transitory computer-readable storage medium of claim 15, wherein, for each browser tab of the plural browser tabs, the set of in-focus time periods is determined at least in part by clipping with respect to a sequence of events for the browser tab.

19. The non-transitory computer-readable storage medium of claim 15, the operations further comprising:
receiving a respective tab identifier to identify each of the plural browser tabs; and
receiving a page visit key to indicate the webpage.

20. The non-transitory computer-readable storage medium of claim 15, wherein the user interaction that was focused on the browser tab corresponds to at least one of a mouse click event, a key press event, an input change event, a viewport scroll event, or a select change event performed with respect to the browser tab.

* * * * *

UNITED STATES PATENT AND TRADEMARK OFFICE
CERTIFICATE OF CORRECTION

PATENT NO. : 11,657,108 B1
APPLICATION NO. : 17/949882
DATED : May 23, 2023
INVENTOR(S) : Zakrevskis et al.

Page 1 of 3

It is certified that error appears in the above-identified patent and that said Letters Patent is hereby corrected as shown below:

In the Specification

In Column 3, Line 3, delete "any," and insert --any-- therefor

In Column 3, Line 8, after "device", insert --104--

In Column 3, Line 14, delete "son" and insert --.json-- therefor

In Column 4, Line 2, delete "112," and insert --112.-- therefor

In Column 5, Line 22, delete "(AK)" and insert --(API)-- therefor

In Column 5, Line 31, after "server", insert --116--

In Column 5, Line 50, after "script", insert --114--

In Column 5, Line 67, delete "including;" and insert --including the-- therefor

In Column 6, Line 10, delete "118" and insert --124-- therefor

In Column 7, Line 36, after "database", insert --300--

In Column 7, Line 66, delete "third-party," and insert --third-party-- therefor

In Column 9, Line 28, delete "adaptability," and insert --adaptability-- therefor In Column 9, Line 42, after "client", insert --112--

In Column 9, Line 58, after "devices", insert --104--

Signed and Sealed this
Eighth Day of October, 2024

Katherine Kelly Vidal
*Director of the United States Patent and Trademark Office*

CERTIFICATE OF CORRECTION (continued)
U.S. Pat. No. 11,657,108 B1

In Column 9, Line 63, after "client", insert --112--

In Column 10, Line 60, after "table", insert --302--

In Column 11, Line 26, after "table", insert --310--

In Column 11, Line 27, after "table", insert --312--

In Column 11, Line 60, delete "E." and insert --E,-- therefor

In Column 12, Line 6, after "architecture", insert --500--

In Column 12, Line 49, delete "508)," and insert --508).-- therefor

In Column 13, Line 29, after "server", insert --122--

In Column 13, Line 49, after "SLQ", insert --124--

In Column 13, Line 60, delete "focused," and insert --focused-- therefor

In Column 14, Line 1, after "module", insert --514--

In Column 14, Line 43, after "replay", insert --504--

In Column 15, Line 11, delete "A-C," and insert --A-C.-- therefor

In Column 15, Line 30, delete "potentially-include" and insert --potentially include-- therefor In Column 16, Line 15, delete "a." and insert --a-- therefor In Column 16, Line 35, delete "by," and insert --by-- therefor In Column 17, Line 5, after "module", insert --514--

In Column 17, Line 40, delete "inserted rule, deleted rule, and adopted style sheets." and insert --inserted_rule, deleted_rule, and adopted_style_sheets.-- therefor In Column 17, Line 59, delete "URI-changes)" and insert --URL changes)-- therefor In Column 18, Line 7, after "of", insert --all--

In Column 19, Line 7, after "instructions", insert --810--

In Column 19, Line 8, delete "apples," and insert --applet,-- therefor

In Column 19, Line 48, delete "I/O" and insert --(I/O)-- therefor

CERTIFICATE OF CORRECTION (continued)
U.S. Pat. No. 11,657,108 B1

In Column 19, Line 58, after "processor", insert --812--

In Column 20, Line 3, delete "806," and insert --814,-- therefor

In Column 21, Line 10, delete "stilt" and insert --still-- therefor

In Column 21, Line 39, delete "components." and insert --components,-- therefor

In Column 22, Line 21, after "architecture", insert --904--

In Column 23, Line 20, delete "(SLK)" and insert --(SDK)-- therefor

In Column 23, Line 23, delete "IOS™; ANDROID™" and insert --IOS™, ANDROID™,-- therefor In Column 24, Line 36, delete "(AMC)," and insert --(ASIC).-- therefor In Column 25, Lines 56-57, delete "waves/'modulated" and insert --waves/modulated-- therefor In the Claims In Column 28, Line 1, in Claim 13, delete "event;" and insert --event,-- therefor In Column 28, Line 28, in Claim 16, delete "tune" and insert --time-- therefor In Column 28, Line 33, in Claim 16, delete "e" and insert --the-- therefor